Figure 1:
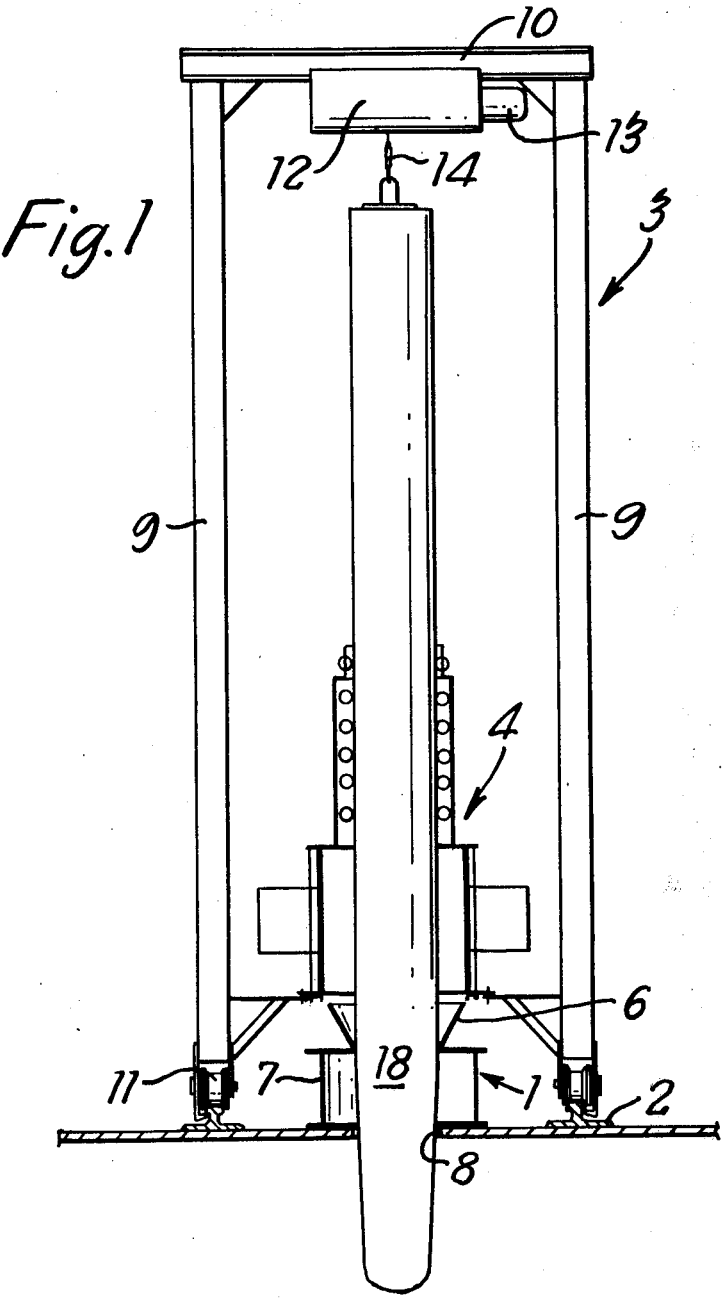

United States Patent [19]

Jaunich et al.

[11] 4,121,955
[45] Oct. 24, 1978

[54] TREATMENT OF ELECTRODES

[75] Inventors: Helmut Jaunich; Dietger Dunkelmann; Josef Schiffarth, all of Postfach, Germany

[73] Assignee: Foseco Trading A.G., Chur, Switzerland

[21] Appl. No.: 720,662

[22] Filed: Sep. 7, 1976

[30] Foreign Application Priority Data

Sep. 5, 1975 [GB] United Kingdom ............... 36696/75

[51] Int. Cl.² .............................................. H05B 7/10
[52] U.S. Cl. .......................................... 156/71; 13/16; 212/11
[58] Field of Search ...................... 427/59; 212/11, 14; 118/425; 100/232; 13/16; 156/71

[56] References Cited

U.S. PATENT DOCUMENTS

| 3,247,974 | 4/1966 | Dechantsreiter | 212/14 |
| 3,384,926 | 5/1968 | Tsujii | 100/232 |
| 3,892,886 | 7/1975 | Schmidt et al. | 427/59 |
| 3,929,231 | 12/1975 | Cook | 212/14 |
| 3,939,028 | 2/1976 | Schiffarth et al. | 427/59 |

Primary Examiner—Edward G. Whitby
Attorney, Agent, or Firm—Cushman, Darby & Cushman

[57] ABSTRACT

A method of treating an electrode used in an electric arc furnace at a steel plant, which comprises locating the electrode to be treated in a holder therefor by bringing the electrode to the holder using the main crane at the steel plant, bringing to the electrode in the holder a crane of a relatively low lifting capacity and either
(i) an applicator for applying a coating of a set of preformed tiles to the electrode, or
(ii) securing means and a fresh length of electrode to be secured on top of the electrode in the holder, respectively causing the applicator to apply the coating or the securing means to secure the fresh length to the electrode while holding the electrode or fresh length of electrode respectively in the crane of relatively low lifting capacity, and removing from the area of the holder the crane and the applicator or the securing means respectively.

7 Claims, 3 Drawing Figures

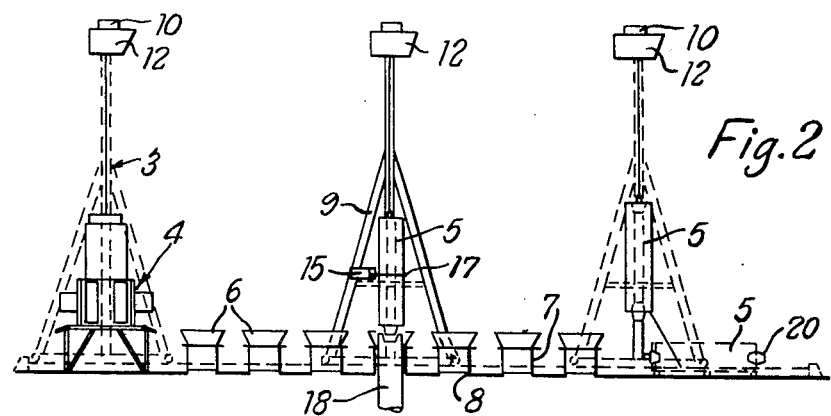
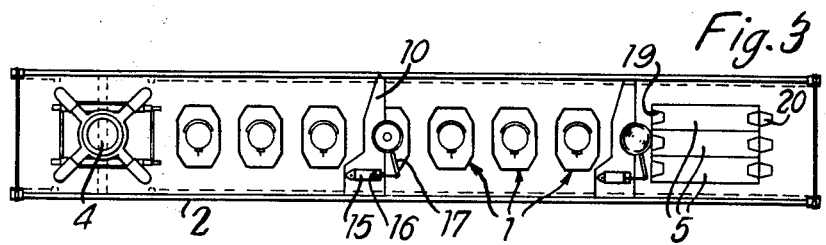

TREATMENT OF ELECTRODES

This invention relates to the treatment of electrodes of the type used in electric arc furnaces.

In U.S. Pat. No. 3,939,028 there is described a coating for an electrode, typically of carbon, formed of a set of preformed tiles which are secured on to the side surfaces of the electrode. Such tiles may be formed of a material such as a matrix having a melting point below 1000° C. and a refractory filler. The presence of the tiles protects the sides of the electrode from attack by the corrosive atmosphere in the furnace. In our copending application for U.S. Pat. No. 682,873 (F.S. 841) we have described a mechanical applicator for applying a set of the tiles to the sides of an electrode.

The useful life of an electrode is increased by the coating since, in use, electrode side wall loss is reduced to a minimum, the majority of the electrode loss occurring linearly via the tip in the arc area. However, while the presence of coating achieves economies by increasing the life of the electrode, it is necessary to use the main crane at the steel plant to lift the electrode into the applicator for coating, support it there during coating, and then return it to the furnace or store. This diverts that main crane from other more profitable activities at the plant, so restricting the advantage of the coating technique.

It is an object of this invention to provide a method and apparatus which will extend the use of electrode coating and allow it better to achieve its full potential as an industrial technique.

According to a first feature of the present invention there is provided a method of treating an electrode used in an electric arc furnace at a steel plant, comprising locating the electrode to be treated in a holder therefor by bringing the electrode to the holder using the main crane at the steel plant, bringing to the electrode in the holder a crane of a relatively low lifting capacity and either (i) an applicator for applying a coating in the form of a set of preformed tiles to the electrode, or
(ii) securing means and a fresh length of electrode to be secured on top of the electrode in the holder, respectively causing the applicator to apply the coating or the securing means to secure the fresh length to the electrode, while holding the electrode or fresh length of electrode respectively in the crane of relatively low lifting capacity, and removing from the area of the holder the crane and the applicator or the securing means respectively.

By the use of such a system the main crane need only be used to extract the electrode from the furnace for treatment and to return the treated electrode to the furnace.

According to a further feature of the invention there is provided apparatus for use in applying protective sheets to the surface of electric arc furnace electrodes which comprises a plurality of open-topped holders, each capable of receiving and supporting in a vertical position one of the electrodes to be treated, a carriage mounted for movement relative to the holders, an applicator mounted on the carriage and operable to apply protective sheets to an electrode, and a crane also mounted on the carriage, the arrangement being such that the carriage can be moved into a position above any selected one of the holders, in which position the crane is operable to raise the electrode in that holder and support it within the applicator during operation of the latter and subsequently lower it back into the holder.

The holders are preferably disposed in line and the carriage is supported on a pair of rails disposed on opposite sides of the line of holders, the carriage comprising a pair of side frames between which the applicator is supported and a beam extending between the side frames above the applicator and supporting the crane, the crane including electrode supporting means which can be raised and lowered through the applicator.

The applicator may if desired be detachably mounted on the carriage so it can be detached and replaced by securing means adapted to engage an extension electrode suspended from the crane and to couple the extension electrode to the electrode in the holder above which the carriage is positioned.

Preferably the crane on the carriage has a lifting capacity of 3 to 5 tons. The securing means is preferably adapted to rotate the fresh length of electrode to screw it into the part-used electrode in the holder.

One embodiment of the invention is shown, by way of example, in the accompanying diagrammatic drawings, in which FIG. 1 is an end elevation of a mobile carriage bearing an overhead crane and carrying a coating applicator for applying coating sheets to an electrode;

FIG. 2 is a side elevation showing a line of electrode holders, and the carriage in three different positions, and FIG. 3 is a plan view of the line of holders of FIG. 2.

Referring to the drawings a line of seven electrode holders 1 is shown, located between a pair of rails 2. A mobile carriage 3 is arranged to be moved on the rails 2 up and down the line. The rails 2 extend beyond each end of the line of holders 1: at one end there is a storage area for a coating applicator 4, and at the other a storage area for fresh lengths 5 of electrode.

Each holder 1 consists of an upwardly flared cup 6 mounted on a cylinder 7 overlying a hole 8 of sufficient depth to receive an electrode. The holders may be located on the ground or on a platform of sufficient height above the ground to avoid the need for digging holes.

The carriage 3 comprises two side frames 9 having a lower triangular frame section between which frames is a jib 10. The feet of the side frames 9 have wheels 11 to run along the rails 2. A winch 12, which can be powered by an electric or hydraulic motor 13 is mounted on the jib 10. A load chain 14 depends from the winch 12.

For applying fresh electrode lengths, a hydraulic piston/cylinder 15 (FIGS. 2 and 3) the piston 16 of which is cranked to an arm 17 adapted to rotate a fresh length of electrode 5 on to an electrode 18, can be mounted on the carriage 3 as shown in the centre and right hand parts of FIGS. 2 and 3.

For applying coating in the form of tiles to the electrode the applicator 4 is mounted on carriage 3, as shown at the left hand ends of FIGS. 2 and 3 and in FIG. 1. The structure of the applicator 4 and its method of use are described and claimed in our application for U.S. Pat. No. 682,873 (F.S. 841).

In use, a new electrode 18 for an electric arc furnace is first brought by the main crane (not shown) at the steel plant, to one of the holders 1. The carriage 3 bearing the applicator 4, already loaded with a set of tiles, not shown, is then moved along rails 2 until the applicator is above the electrode 18. Electrode 18 is then raised to the position shown in FIG. 1 by use of the winch 12.

The applicator 4 is then operated to apply a coating in the form of tiles to the electrode, as described in the above mentioned application 682,873 while the electrode hangs as shown. After coating, the electrode is lowered and the carriage 3 moved away.

When an electrode in use at the furnace is in need of replacement, the main crane lifts that electrode out of the furnace and puts it in one of the holders 1. The main crane then lifts the already prepared electrode 18 and puts it in the furnace as a replacement for the one just removed. The main crane, having arrived at this delivery operation, is then returned to other duties. The carriage 3 is then moved along the rails 2 to bring the applicator 4 to a position over the still hot electrode and the electrode raised and applicator 4 operated to apply a coating to the electrode. If it is desired to lengthen the electrode, the carriage 3 is moved to the left hand end of the line as seen in FIGS. 2 and 3 and the applicator 4 removed. The carriage is then moved to the other end of the line, the electrode screwing assembly 15, 16, 17 affixed and a fresh length 5 of electrode picked up by winch 14. The carriage is then moved to the desired position to locate the new length 5 on top of the coated electrode, and length 5 is then locked to the old electrode by the powered arm 17. Arm 17 also grips the length 5 while it is being moved on carriage 3. The end of the old electrode has a screw threaded recess 19 and one end of the fresh length 5 has a threaded projection 20 complementary to the recess. The used electrode is thus coated and lengthened to form a replacement electrode.

We claim:

1. In the method of treating an electrode used in an electric arc furnace at a steel plant, which comprises locating the electrode to be treated in a holder therefor by bringing the electrode to the holder using the main crane at the steel plant, the improvement which comprises bringing to the electrode in the holder a carriage on which is mounted a crane of a relatively low lifting capacity relative to the main crane and an applicator for applying a coating in the form of a set of preformed tiles to the electrode, causing the applicator to apply the coating to the electrode while holding the electrode in the crane of relatively low lifting capacity, and removing the crane and the applicator from the area of the holder.

2. Apparatus for use in applying protective sheets to the surface of electric arc furnace electrodes which comprises a plurality of open-topped holders, each capable of receiving and supporting in a vertical position one of the electrodes to be treated, a carriage mounted for movement relative to the holders, an applicator mounted on the carriage and operable to apply protective sheets to an electrode, and a crane also mounted on the carriage, the arrangement being such that the carriage can be moved into a position above any selected one of the holders, in which position the crane is operable to raise the electrode in that holder and support it within the applicator during operation of the latter and subsequently lower it back into the holder.

3. Apparatus in accordance with claim 2 in which the holders are disposed in line and the carriage is supported on a pair of rails disposed on opposite sides of the line of holders, the carriage comprising a pair of side frames between which the applicator is supported and a beam extending between the side frames above the applicator and supporting a winch, the winch carrying electrode supporting means which can be raised and lowered through the applicator.

4. Apparatus in accordance with claim 2 in which the applicator is detachably mounted on the carriage and there is also provided securing means which can be mounted on the carriage and are adapted when so mounted to engage an extension electrode suspended from the crane and to couple the extension electrode to the electrode in the holder above which the carriage is positioned.

5. Apparatus according to claim 2 wherein the crane is of 3 to 5 tons capacity.

6. Apparatus according to claim 2 and including means for screwing an extension electrode suspended from the crane on to an electrode in a holder.

7. In the method of treating an electrode used in an electric arc furnace at a steel plant, which comprises locating the electrode to be treated in a holder therefor by bringing the electrode to the holder using the main crane at the steel plant, the improvement which comprises bringing to the electrode in the holder a crane of a relatively low lifting capacity and securing means and a fresh length of electrode to be secured on top of the electrode in the holder, causing the securing means to secure the fresh length to the electrode, while holding the fresh length of electrode in the crane of relatively low lifting capacity, and removing from the area of the holder the crane and the securing means.

* * * * *